E. P. SCHONK.
REAMER.
APPLICATION FILED OCT. 16, 1918.
1,328,208.
Patented Jan. 13, 1920.
2 SHEETS—SHEET 2.
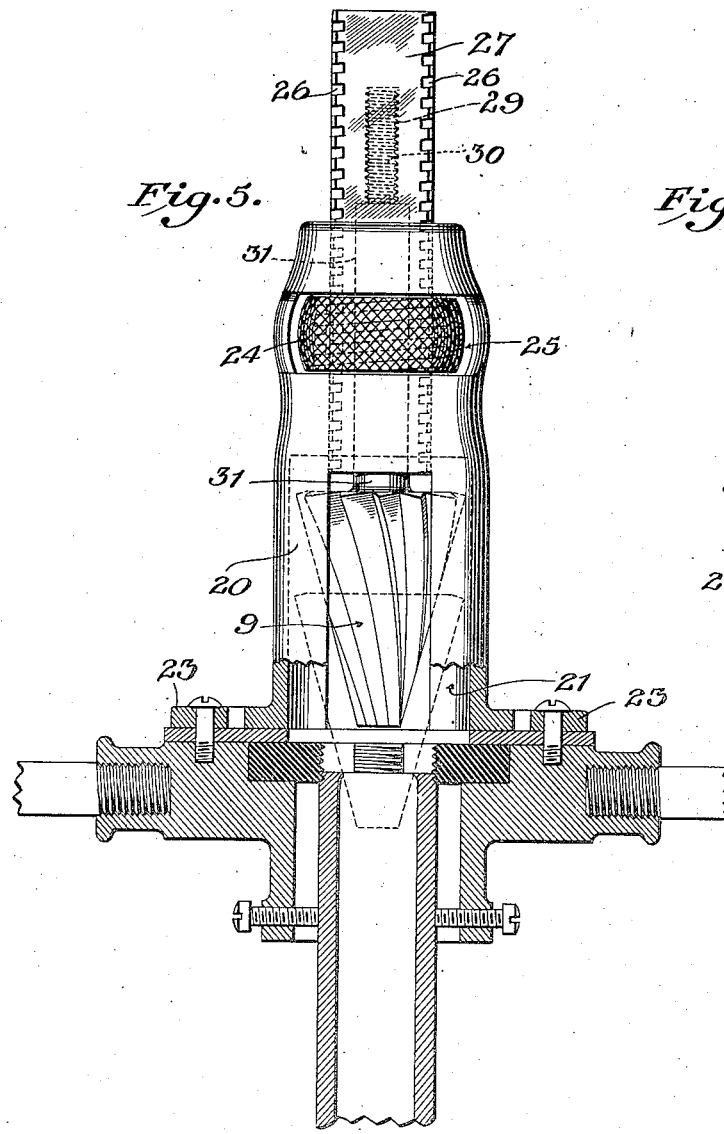
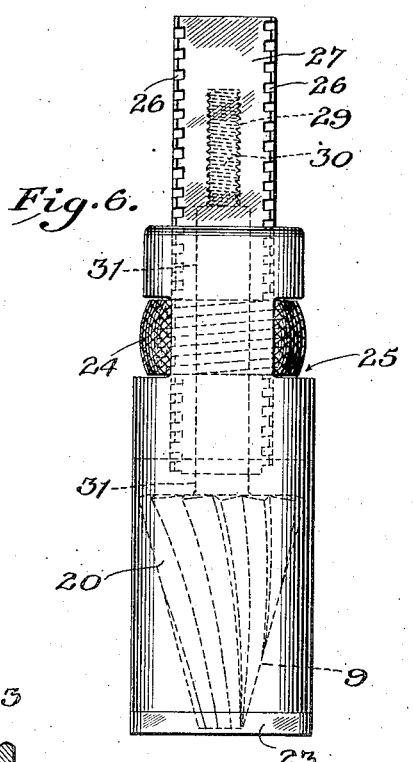
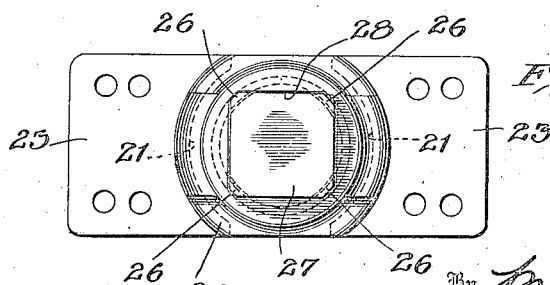
Inventor
Edward P. Schonk

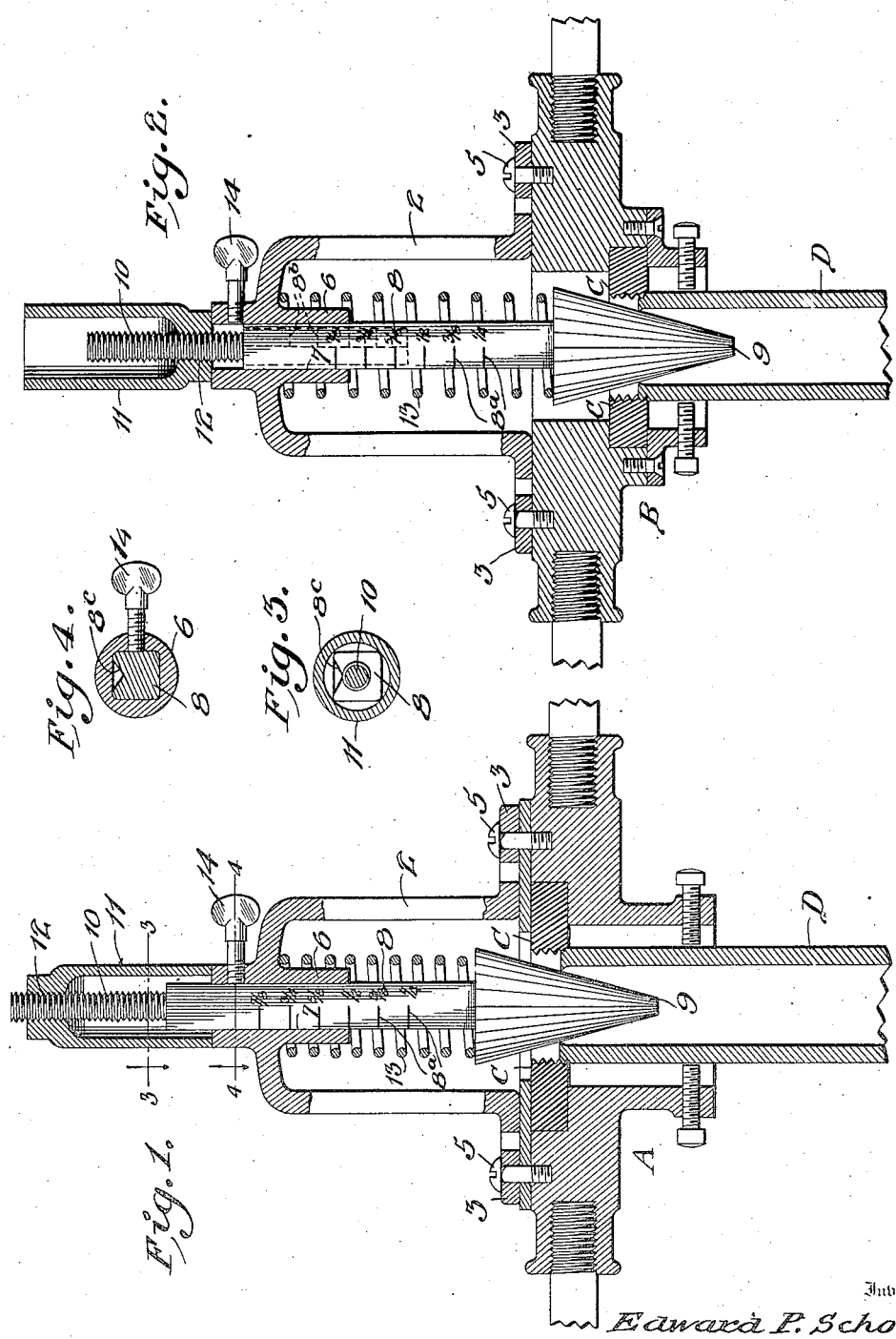

UNITED STATES PATENT OFFICE.

EDWARD P. SCHONK, OF WILKES-BARRE, PENNSYLVANIA.

REAMER.

1,328,208.  Specification of Letters Patent.  Patented Jan. 13, 1920.

Application filed October 16, 1918. Serial No. 258,770.

*To all whom it may concern:*

Be it known that I, EDWARD P. SCHONK, a citizen of the United States, residing at Wilkes-Barre, in the county of Luzerne and State of Pennsylvania, have invented certain new and useful Improvements in Reamers; and I do hereby declare the following to be a full, clear, and exact description of the invention, such as will enable others skilled in the art to which it appertains to make and use the same.

This invention relates to drilling and boring apparatus and more particularly to a tool for simultaneously threading and reaming the end of a pipe or other tube.

It is well known that when pipes or tubes are circumferentially cut or threaded that there is a tendency toward the formation of an internal bur or inward turning of the metal so that there is a measurable reduction of size of the passage at that point which materially reduces the capacity of flow due to loss of area through the pipe or tube.

It is one of the objects of the present invention to provide a simple hand or otherwise driven tool whereby the bur or inwardly turned portion of the end of the tube or pipe may be reamed practically simultaneously with the cutting or threading of the end of the pipe or tube.

A further object of the present invention is to provide means readily attachable to the usual or ordinary form of die-stocks or other cutting tools commonly used for cutting or threading tubes or pipes and especially to provide for such an attachment without substantial change, alteration, or work being necessary to render the attachment applicable to the usual die-stock or cutting device upon which the attachment may be applied.

Another object of the present invention is to provide a reamer having a very large range of capacity for use in conjunction with die-stocks or cutting devices whereby tubes or pipes of various sizes may be simultaneously cut or threaded and reamed without requiring the interchange of reaming attachments for die-stocks.

A further object contemplated by this invention is to provide for the disengagement of the reamer or reaming tool which is used in the device from contact with the pipe or tube which is being reamed when the cutting and reaming operation has been completed and it is desired to reverse the direction of rotation of the cutting device or die-stock in the removal of the latter from the pipe or tube and thus to protect and preserve the cutting edges of the reamer from unnecessary wear owing to engagement of the edges of the reamer with the reamed surface during the removal of the device from position on the pipe.

With these and other objects in view, as will be apparent to those skilled in the art, the present invention consists in the novel construction and arrangement of the parts, the combination of the parts, and any details of construction of the device as will be more particularly hereinafter set forth and a preferred embodiment of which is illustrated in the accompanying drawings, in which,—

Figure 1 shows my improved reamer attachment in combination with an ordinary form of die-stock in which the cutters are arranged adjacent the upper face of the body of the die-stock, the view being a central vertical section through the apparatus, parts thereof being in elevation.

Fig. 2 is a similar sectional view of the device, arranged in combination with an adjustment upon a well known form of die-stock in which the cutters are arranged in a plane somewhat below the top of the body of the die-stock.

Fig. 3 is a detail in cross-section on line 3—3 of Fig. 1, showing the socket or guide of the yoke for the reamer stem and means for locking the stem in disengaged position during the backing off or removal of the device from the pipe.

Fig. 4 is a cross-section on line 4—4 of Fig. 1.

Figs. 5, 6 and 7 show another form of the reamer attachment.

In Figs. 1 and 2 there is conventionally represented different forms of standard or well known die-stocks "A" and "B" respectively, which are provided with usual thread cutters "C" which, when the die-stock is fitted to the end of the pipe or tube to be cut or threaded and revolves, operate to produce external threads on the pipe or tube D and sometimes during this process, and sometimes during the cutting of the pipe or tube into sections, the ends of the latter become burred or inwardly turned and thus materially reduce the area of the pipe and interferes with the flow. Sometimes this bur is removed by a subsequent operation after the threading or cutting of the pipe and it has been proposed to remove the bur simultaneously with the cuttings of the threads by the die-stock.

The present invention relates more particularly to the provision of a simple, substantial and practicable reaming attachment, one size of which is capable of being applied to various forms and sizes of well known die-stocks without material change or alteration to the latter, and one embodiment of the invention is shown in which there is provided a substantial U-shaped yoke 2, having outwardly divergent terminals 3 provided with holes 4 arranged at suitable points in the flanges 3 to enable the fastening of the yoke 2 to the die-stocks A or B by screws or bolts 5, or other suitable fastening means which may be applied to tapped or other holes with which the die-stock may be ordinarily provided for other purposes, for instance, to receive the screws which retain the die-holding caps or plates to the body of the die-stock. The yoke 2 is applied in inverted position to the die-stock and fastening thereon and has at its upper end a central socket or guide portion 6 of suitable length, having a bore 7 preferably of polygonal cross-sectional outline to receive the stem 8 of the reamer 9, the stem being of similar cross-sectional form to the bore 7 of the socket 6 and slidably fitted therein so that the reamer 9 is held against relative rotation in the socket 6 and therefore when the reamer and its mountings have been applied to a die-stock, and the latter turned, the driving power will be transmitted to the reamer and it will operate to cut or ream the end of the pipe or tube D when the latter is engaged by the reamer.

It is one of the important objects of the present invention to provide a reamer attachment for die-stocks which is not only readily attachable to divers forms of well known die-stocks, but it is the further object to provide a reamer which has the capacity of operating successfully when adjusted upon the various forms of die-stocks and can be used to ream a large range of size of pipes or tubes. To that end, in the form of the invention herein illustrated, the upper end of the reamer stem 8 is shown as externally threaded at 10 and engages a sleeve 11 having a threaded end 12. The sleeve 11 provides, substantially, a handle and guard for the stem 8 of the reamer 9 where it projects above the upper end of the socket 6 of the yoke 2, and the lower end of the sleeve is normally pushed downwardly into yielding contact with the socket end by means of an expansile spring 13 which serves to hold the reamer 9 projected inwardly through the yoke 2 and in the central chamber of the die-stock A to yieldingly engage the adjacent end of the tube B being threaded. I prefer to use a tapering or conical form of reamer 9 of comparatively elongated form, thus giving capacity through its various diameters for operating upon various sizes of pipes or tubes to be reamed as they are threaded.

In operating the apparatus, the position of the reamer 9 may be nicely predetermined through the means of the threaded sleeve 11 which can be adjusted along the threaded portion 10 of the reamer stem 8 to determine the relative position of the reamer 9 to the die-stock A and the yoke 2.

To further increase the range of adjustment and the adaptability of the reamer to different types of die-stocks and for reaming different sizes of pipes, the handle 11 is shown as provided with the threads 12 at one end and is therefore reversible so that the threads may be positioned away from the socket upon the yoke as in Fig. 1, or the threaded end of the handle or sleeve may be disposed in position adjacent to the end of the socket 6. In the latter instance the reamer 9 can be lowered well into the body of the die-stock A, as when the threaded cutters C are located below the top surface of the die-stock, and in the first instance, or when the handle 11 is reversed, the upper end of the stem 8 would be engaged by the threads 12 and the reamer 9 held in a relatively elevated position in the die-stock.

By mounting the fastening device for holding the reamer in disengaged position upon the socket portion of the yoke, this disengagement may be effected without changing the relative adjustment of the reamer and its sleeve or adjusting member.

A further valuable feature of the present invention resides in the provision of means for maintaining the cutting edges of the reamer 9 clear of the end of the pipe or tube D after the latter has been reamed and during the backing off of the apparatus. Suitable means may be adapted for this purpose, one form of which is shown in this instance as comprising a set-screw 14 threaded in the socket 6 and adapted to be set up against the shank 8 when the latter has been lightly pulled upwardly to raise the reamer 9 from the seat it has cut in the pipe D when rotated by the die-stock. After the reamer has been adjusted clear of the pipe the die-stock may be turned off the pipe without the threads of the reamer being engaged and unnecessarily worn by reason of contact of the reamer with the pipe.

From the foregoing it will be seen that I have provided a very simple and substantial form of reaming attachment for combination with die-stocks of various forms and which is capable of use upon a large range of sizes of pipes or tubes and provides for the protection of the reamer edges.

It will be obvious that various changes in size and proportion of the apparatus may be resorted to within the skill of those skilled in the art without departing from the scope of the invention and within the limits of the appended claims.

For facilitating and expediting the adjustment of the reamer head 9 on the diestock to operate upon tubes or pipes of different diameters, suitable indicating means may be provided. In the form illustrated one of the side facets of the shank 8 of the reamer head 9 is provided as shown in Fig. 1 with a series of graduations $8^a$ suitably indexed to indicate the proper adjustment of the reamer for a given size of pipe. To distinguish between the smaller sizes of pipe and the larger sizes of pipe upon which the tool may be adjusted to operate another of the facets of the stem 8 may be provided with a series of graduations $8^b$ indicated in dotted lines in Fig. 2, these graduations being formed on one of the faces of the grooved side $8^c$ of the stem, the groove being shown in the cross sectional detail, Fig. 4. To adjust the reamer it is simply necessary to turn the adjusting member 11 until the proper index graduation is brought into register with a convenient fixed mark or sighting edge on the yoke structure to obtain the proper position of the reamer head.

In Figs. 5 to 7 there is shown another form of the invention in which the yoke 20 is provided with laterally extending lugs 23 between the inner ends of which below the body of the yoke there is provided a chamber 21 into which the reamer 9 may be retracted through means of a nut 24 suitably mounted in aperture 25, in the head of the yoke, this nut engaging the threads 26 which are formed on the corners of a polygonal bushing 27, slidably fitting a complementary axial chamber or bore 28 formed to receive the same in the head of the yoke. The bushing is provided with internal threads 29 at its upper end to receive the threaded part 30 of the stem 31 of the reamer 9, the threads 30 on the stem being pitched oppositely to the threads of the nut 24 so as to prevent the unscrewing of the reamer 29 from the bushing when the reamer is utilized in cutting the interior of pipe D for instance as shown in Figs. 1 and 2. It will be seen that the form of the invention as shown in Figs. 5, 6 and 7 provide for ample longitudinal or axial adjustment of the reamer 9 into the work being cut and enables the use of the device on pipes of various diameters. Moreover this form of the device is simple in adjustment and operation. It is practicable and inexpensive as to cost of construction as it consists of but four very simple elements.

What I claim as new is:—

1. The combination with a die-stock, of a reaming attachment comprising a yoked bearing member connectible to the die-stock and a reaming tool, slidably mounted therein, said tool having a square stem portion and a threaded stem portion, and a handle engaging said threaded portion and forming means for withdrawing the reaming tool to a disengaging position, one end of said handle having a bore adapted to receive said square stem portion and means for locking the tool in disengaging position to permit the apparatus to be removed from the work while the reaming tool is removed from contact therewith.

2. A die-stock having, in combination, a reamer having a square stem alined with the axis of the die-chamber and reduced and threaded at its upper end, a yoke detachably connected to the die-stock and in which the square stem of said reamer is mounted, an expansion spring intermediate said reamer and yoke, and a reversible handle adjustable along the threaded portion of said stem to vary the position of the tool relative to the die-stock, one end of said handle having a bore adapted to receive said square stem.

In testimony whereof I affix my signature.

EDWARD P. SCHONK.